March 27, 1934.  C. C. MINTER  1,952,881
INTERNAL COMBUSTION ENGINE
Filed July 30, 1932
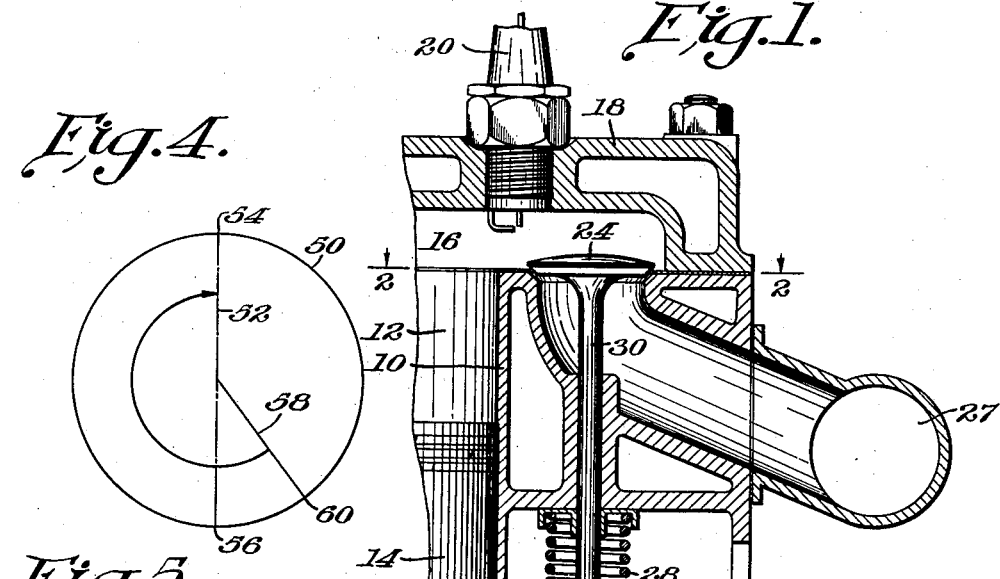
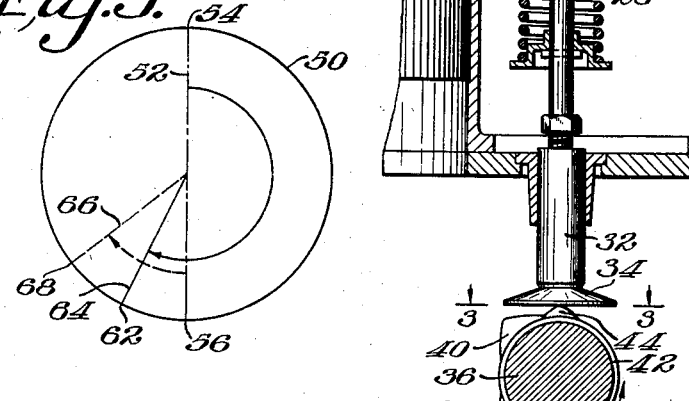
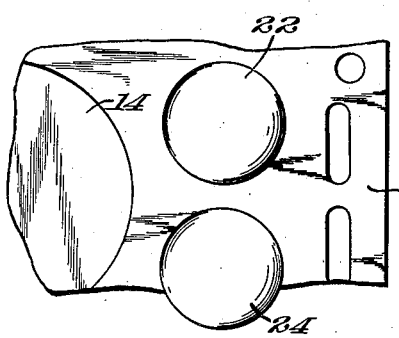
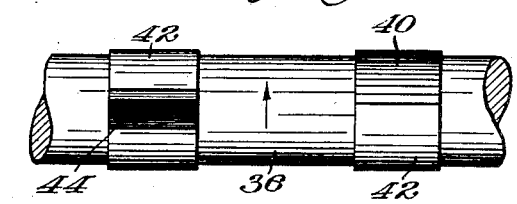
CLARKE C. MINTER
INVENTOR
BY R. J. Dearborn
HIS ATTORNEY Patented Mar. 27, 1934

1,952,881

UNITED STATES PATENT OFFICE 1,952,881

INTERNAL COMBUSTION ENGINE

Clarke C. Minter, Fishkill, N. Y.

Application July 30, 1932, Serial No. 626,899

2 Claims. (Cl. 123—75)

This invention relates to internal combustion engines and more particularly to a method and apparatus for reintroducing exhaust gases into the combustion zone of the engine.

An object of the invention is to reintroduce a portion of the exhaust gases into the combustion zone of the engine to prevent detonation and to improve the general operation of the engine.

Another object of the invention is to provide a simple and efficient means of reintroducing exhaust gases into the combustion chamber of an engine.

Exhaust gases have been introduced heretofore into the combustion chamber of internal combustion engines but the results have been unsatisfactory due to mechanical difficulties or impairment of the operating efficiency of the engine, such as decrease in power. The customary method heretofore of reintroducing exhaust gases into the combustion zone has consisted in mixing the exhaust gases with the air as it flows into the inlet of the carburetor, or by injecting the gases into the intake manifold where they mix with the air-fuel mixture before entering the cylinder. According to prior methods, therefore, the exhaust gases were required to be taken from the exhaust manifold and conducted by means of pipes to the inlet of the carburetor or to the intake manifold, and the flow thereof had to be regulated by small valves or other metering devices in the connections. In order to satisfy the requirements of the engine under different operating conditions and to be effective and not interfere with the performance of the engine, it was desirable that the regulation of the flow of the gases to the carburetor or intake manifold be automatic, for example, by linking the regulating devices with the throttle. It will accordingly be observed that the mechanical difficulties to be surmounted were necessarily great, and results have not been satisfactory. In addition, the introduction of exhaust gases through the intake system of an engine reduces the power of the engine, since these exhaust gases take the place of a portion of the air handled by the engine.

According to the present invention, instead of discharging the exhaust gases into the carburetor or mixing them with the air-fuel mixture a small portion of the gases is reintroduced through the exhaust valve. During certain intervals in the cycle of the engine a relatively low pressure exists in the combustion chamber and by reopening the valve at a proper and predetermined period of the cycle the exhaust gases will flow from the exhaust manifold directly to the combustion chamber. The exhaust valve for this purpose may be open in proper time relation with the other operating parts of the engine by providing an auxiliary cam on the cam shaft to actuate the valve as desired.

The invention may be more fully understood from the following description in connection with the accompanying drawing, in which Fig. 1 is a vertical transverse section through a portion of a cylinder block and head on a plane parallel to the cylinder axis;

Fig. 2 is a sectional top view of the cylinder head along the line 2—2 of Fig. 1;

Fig. 3 is a top view along the line 3—3 of Fig. 1 showing a portion of the cam shaft and the auxiliary cam of the invention;

Fig. 4 is a diagrammatic representation of the conventional power and exhaust strokes of a cylinder of an engine.

Fig. 5 is a diagrammatic representation of the intake and compression strokes of a cylinder, illustrating the opening and closing of the exhaust valve according to the invention.

Referring to Fig. 1, the numeral 10 represents a cylinder block which is provided with a bore 12 and a reciprocating piston 14. The cylinder bore 12 communicates at the top with a combustion chamber 16 formed by a detachable head 18 containing a spark plug 20. The intake valve port and exhaust valve port, controlled by valves 22 and 24 respectively, open into the combustion chamber through the floor 26, which may be integral with the block 10. The exhaust port opens into an exhaust manifold 27 leading to an exhaust pipe (not shown). The intake port, similarly, communicates in the conventional manner with an intake manifold and a carburetor (not shown).

The exhaust valve 24, which is normally closed by a spring 28, is in cooperative relationship through suitable mechanical connections, such as stem 30, tappet 32, and cam follower 34, with a cam shaft 36. The tappet 32 is actuated by an exhaust cam 38 positioned with proper relation to an intake cam 40 so that the valves are operated in proper time relation to permit the desired functioning of the engine. Located on the same base circle 42 for the cam follower 34 is a small auxiliary cam 44 which also actuates the valve 24. The cam 44 may be any well known or preferred type commonly used in internal combustion engines, such as the tangential, the constant acceleration, or the mushroom follower type. The combustion engine, with the exception of the auxiliary cam 44, which is an important part of the present invention, is the construction of an ordinary engine and is shown merely for purposes of illustration and properly explaining the invention. It is to be understood, of course, that the invention may be used in connection with any well known or preferred type of internal combustion engine.

In Figs. 4 and 5 is shown the operation of an engine equipped with an auxiliary cam and operated according to the invention. Referring to Fig. 4, the circle 50 represents one complete cycle of the piston in which the vertical line or diameter 52 bisecting the circle shows the position of top center 54 and of bottom center 56, while the radius line 58 defines a point 60, on the circumference of the circle, where the exhaust valve opens. The same valve closes again at top center 54. The arc from 54 to 60 represents the power stroke of the engine while the arc from 60 to 54 is the exhaust stroke. This operation is that of an ordinary internal combustion engine.

Fig. 5 shows the intake and compression strokes of the engine by a diagram similar to Fig. 4 in which is shown on the circle, top center, and bottom center. In this case, however, the intake valve opens at top center 54 and closes again at 62, the latter point being defined by a radius line 64. Accordingly, the arc from 54 to 62 represents the intake stroke while the arc from 62 to 54 is the compression stroke. Figs. 4 and 5 represent two complete revolutions to correspond to one complete cycle of an internal combustion engine working on the Otto or constant volume cycle.

Attention is now called to Fig. 5 in which the dotted radius line 66 defines a point 68 on the circle 50. According to a preferred method of operation the auxiliary cam 44, referred to heretofore, is placed at a predetermined point on the cam shaft to open the exhaust valve at the point 56 and to close said valve again at the point 68. The space, defined by the arc from 56 to 68 shows the interval that the exhaust valve may be open to allow exhaust gases to re-enter the combustion chamber at a time when the exhaust valve normally would be closed. For purposes of illustration, the interval is shown to be during the last stages of the intake stroke and the early stages of the compression stroke. It will be understood, of course, that the interval may be altered by changing the cam 44, as long as the valve is open during a time of relatively lower pressure within the cylinder than in the exhaust manifold so that exhaust gases will flow from the exhaust manifold into the combustion chamber. The exact time of opening and closing the exhaust valve for the admission of exhaust gases from the exhaust manifold to the cylinder will depend on the time of closing the intake valve and also will be influenced by other factors of engine design, such as compression ratio, displacement of the cylinder, length of connecting rod, type of engine head, etc.

The quantity of the exhaust gases that will flow from the exhaust manifold into the cylinder will depend on the difference in pressures in the exhaust manifold and the cylinder and the length of time the exhaust valve is kept open. At a given engine speed the difference between the pressures in the exhaust manifold and cylinder will be determined by the load on the engine. The lower the load on the engine, the lower will be the density of the exhaust gases flowing back into the cylinder. As to the length of time the valve is open, it is obvious that the fraction of the total cycle of operation during which the exhaust valve is opened for admission of exhaust gases from the exhaust manifold is determined by the dimensions of the auxiliary cam 44. However, for an auxiliary cam of any given dimensions, the actual length of time the exhaust valve is open is determined by the speed of the engine.

The design of the auxiliary cam being predetermined, the quantity of the exhaust gases reintroduced into the cylinder adjusts itself automatically to the operating conditions of the engine. Thus as the speed of the engine is increased for a given throttle position the pressure in the exhaust manifold increases while the pressure in the cylinder decreases, thereby producing a greater difference between the pressures in the exhaust manifold and in the cylinder. As this pressure difference increases, the velocity with which the exhaust gases flow back into the cylinder will increase and although the length of time the exhaust valve is open will decrease with engine speed, the quantity of exhaust gases that flow back into the cylinder will not change materially as the speed is changed.

While the invention has been described in connection with a certain design of engine it is to be understood that I do not intend to limit myself by the particular embodiment and specific illustrations given herein, but instead I contemplate the adaptation of the invention to any type of internal combustion engine and to include variations in mechanical details and such methods and means as may be necessary to realize the intents and purposes of the invention.

Obviously, many modifications and variations of the invention, as hereinbefore set forth, may be made without departing from the spirit and scope thereof, and therefore only such limitations should be imposed as are indicated in the appended claims.

I claim:

1. In an internal combustion engine provided with a plurality of combustion chambers each chamber having an intake valve and an exhaust valve, a cam shaft carrying cams for actuating said valves for opening said intake valves during the suction stroke and for opening said exhaust valves during the exhaust stroke, small auxiliary cams on said cam shaft, each of said cams being so proportioned and positioned with respect to the corresponding cam for actuating the intake valve as to open said exhaust valve during the last stages of the intake period and the early stages of the compression stroke in the cycle of operation to effect the return of a portion of the exhaust gases to each of said combustion chambers respectively.

2. In a conventional multi-cylinder gasoline engine, in combination with means for actuating the exhaust valve of each cylinder for maintaining the cylinder in communication with the exhaust manifold during substantially the entire period of each alternate upward stroke of the piston, auxiliary means for actuating said exhaust valve for maintaining the cylinder in communication with the exhaust manifold for a small fraction of each upward stroke of the piston, other than said first-named upward strokes.

CLARKE C. MINTER.